United States Patent
Maloney et al.

(10) Patent No.: US 7,464,657 B2
(45) Date of Patent: Dec. 16, 2008

(54) CATAMARAN AIR CUSHION SHIP WITH FOLDING, RETRACTABLE SEALS

(75) Inventors: Kenneth J. Maloney, Covington, LA (US); W. Keith Dubose, Pensacola, FL (US); E. Douglass Whittaker, Slidell, LA (US); Robert G. Moore, Lacombe, LA (US); Jared M. Acosta, Slidell, LA (US)

(73) Assignee: Textron Inc., Wilmington, MA (US)

( * ) Notice: Subject to any disclaimer, the term of this patent is extended or adjusted under 35 U.S.C. 154(b) by 17 days.

(21) Appl. No.: 11/561,691

(22) Filed: Nov. 20, 2006

(65) Prior Publication Data
US 2007/0151495 A1 Jul. 5, 2007

Related U.S. Application Data

(60) Provisional application No. 60/755,938, filed on Dec. 30, 2005.

(51) Int. Cl.
*B63B 1/38* (2006.01)
*B63B 1/00* (2006.01)
(52) U.S. Cl. .................................. 114/67 A; 114/61.1
(58) Field of Classification Search ............... 114/61.1, 114/67 A; 180/116, 121, 122, 126–128; 104/23.2
See application file for complete search history.

(56) References Cited

U.S. PATENT DOCUMENTS

| | | |
|---|---|---|
| 1,976,046 A | 10/1934 | Tietjens |
| 3,065,723 A | 11/1962 | Tulin |
| 3,077,173 A | 2/1963 | Lang |
| 3,141,436 A | 7/1964 | Cathers et al. |
| 3,362,499 A | 1/1968 | Tripp |

(Continued)

FOREIGN PATENT DOCUMENTS

FR 2362035 3/1978

(Continued)

OTHER PUBLICATIONS

John Lewthwaite, "The PACSCAT Concept and its application to Fast Landing Craft", presented at MACC Multi Agency Craft Conference 2002, The Pulse of Technology, Jun. 18-20, 2002, Naval Amphibious Base Little Creek, Norfolk (19 pages).

*Primary Examiner*—Jesús D. Sotelo
*Assistant Examiner*—Daniel V Venne
(74) *Attorney, Agent, or Firm*—Garvey, Smith, Nehrbass & North, L.L.C.; Seth M. Nehrbass; Charles C. Garvey, Jr.

(57) ABSTRACT

A vessel designed to operate efficiently as both a catamaran and air cushion vessel can travel at low speed in a catamaran or displacement mode, high speed in an air cushion mode, and amphibiously with the aid of deployable side seals. The vessel includes catamaran hulls and flexible air cushion bow and stern seal systems together with retractable side seals having hinged doors containing inflatable, retractable flexible components. The doors form part of the side seal system in the deployed position, and protect the flexible components of the seal in the retracted position. The arrangement reduces the drag associated with the side seals while the vessel operates in its catamaran or surface effect ship modes, and prevents damage to the seals during operation in the high speeds SES mode.

52 Claims, 5 Drawing Sheets

U.S. PATENT DOCUMENTS

| | | | |
|---|---|---|---|
| 3,379,270 A * | 4/1968 | Hardy et al. ................ 180/127 |
| 3,389,672 A | 6/1968 | Winter |
| 3,458,007 A | 7/1969 | Todd |
| 3,502,168 A | 3/1970 | Jones |
| 3,589,058 A | 6/1971 | Labat |
| 3,621,932 A | 11/1971 | Tattersall et al. |
| 3,817,479 A | 6/1974 | Crowley |
| 3,893,538 A | 7/1975 | Thompson et al. |
| 3,987,865 A | 10/1976 | Krupp |
| 4,279,322 A | 7/1981 | Wheeler et al. |
| 4,469,334 A | 9/1984 | Le Comte |
| 4,489,667 A | 12/1984 | Moore et al. |
| 4,506,618 A | 3/1985 | Chaplin |
| 4,535,712 A | 8/1985 | Matthews |
| 4,543,901 A | 10/1985 | Stringer |
| 4,646,866 A | 3/1987 | Bertrand et al. |
| 4,660,492 A | 4/1987 | Schlichthorst et al. |
| 4,702,189 A * | 10/1987 | Schlichthorst ............. 114/61.1 |
| 4,708,077 A | 11/1987 | Balquet et al. |
| 4,739,719 A | 4/1988 | Burg |
| 4,767,367 A | 8/1988 | Stringer |
| 4,984,754 A | 1/1991 | Yarrington |
| 5,651,327 A | 7/1997 | Whitener |
| 5,860,383 A | 1/1999 | Whitener |
| 5,934,215 A | 8/1999 | Burg |
| 6,293,216 B1 | 9/2001 | Barsumian |
| 6,439,148 B1 | 8/2002 | Lang |
| 6,487,981 B1 | 12/2002 | Burg |
| 6,526,903 B2 | 3/2003 | Robinson et al. |
| 6,609,472 B2 | 8/2003 | Burg |
| 6,619,220 B1 | 9/2003 | Ducote |
| 7,013,826 B2 | 3/2006 | Maloney et al. |
| 2002/0164231 A1 | 11/2002 | Lucas et al. |
| 2003/0000440 A1 | 1/2003 | Burg |
| 2005/0016436 A1 | 1/2005 | Evans |
| 2005/0211150 A1 | 9/2005 | Maloney et al. |
| 2005/0236200 A1 | 10/2005 | Dubose et al. |

FOREIGN PATENT DOCUMENTS

| | | |
|---|---|---|
| GB | 1109562 | 4/1968 |
| GB | 1110075 | 4/1968 |
| GB | 1191945 | 5/1970 |
| GB | 1215372 | 12/1970 |

* cited by examiner

CATAMARAN AIR CUSHION SHIP WITH FOLDING, RETRACTABLE SEALS

CROSS-REFERENCE TO RELATED APPLICATIONS

Priority of U.S. Provisional Patent Application No. 60/755,938, filed 30 Dec. 2005, incorporated herein by reference, is hereby claimed.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to catamaran air cushion ships. More particularly, the present invention relates to an improved surface effect ship or air cushion ship with a catamaran hull having a folding side seal arrangement that features lockable hinged doors and an inflatable seal portion.

2. General Background of the Invention

In general air cushion vessels or ships, also known as surface effect ships, are known. Examples of air cushion vessels or ships disclosed in U.S. patents are listed in the following table. The following table also lists U.S. Pat. No. 6,619,220 that discloses a surface effect ship or hovercraft with a retractable skirt system.

TABLE 1

| U.S. Pub. No. | Title | Date MM/DD/YYYY |
|---|---|---|
| 1,976,046 | Waterfoil | Oct. 9, 1934 |
| 2,405,115 | Floating Structure | Aug. 6, 1946 |
| 3,065,723 | Supercavitating Hydrofoils | Nov. 27, 1962 |
| 3,077,173 | Base Ventilated Hydrofoil | Feb. 12, 1963 |
| 3,141,436 | Hydrofoil Assisted Air Cushion Boat | Jul. 21, 1964 |
| 3,458,007 | Captured Air Bubble (CAB) Ground Effect Machine | Jul. 29, 1969 |
| 3,621,932 | Gas-Cushion Vehicles | Nov. 23, 1971 |
| 3,917,022 | Twin Cushion Surface Effect Vehicle | Nov. 4, 1975 |
| 3,987,865 | Gas-Cushion Vehicle Skirt | Oct. 26, 1976 |
| 4,469,334 | Sealing System For The Air Cushion Of An Air-Cushion Vessel | Sep. 4, 1984 |
| 4,489,667 | Surface Effect Ship Seals | Dec. 25, 1984 |
| 4,506,618 | Propeller And Keel Arrangement For Surface Effect Ships | Mar. 26, 1985 |
| 4,535,712 | Variable Air Cushion Mode Vehicle | Aug. 20, 1985 |
| 4,543,901 | Surface Effect Ship Air Cushion Seal System | Oct. 1, 1985 |
| 4,646,866 | Surface Effect Type, Side Keel Vessel Fitted With An Improved Forward Buoyancy Cushion Seal Apparatus | Mar. 3, 1987 |
| 4,660,492 | Catamaran Air Cushion Water Vehicle | Apr. 28, 1987 |
| 4,708,077 | Hull Shapes For Surface Effect Ship With Side Walls And Two Modes Of Operation | Nov. 24, 1987 |
| 4,714,041 | Structure of surface effect ship with side walls | Dec. 22, 1987 |
| 4,739,719 | Movable bow seal air ride boat hull | Apr. 26, 1988 |
| 4,767,367 | Integrated Combination Propeller Drive Shaft Fairing and Water Intake Sea Chest Arrangement, For High Speed Operating Marine Craft | Aug. 30, 1988 |
| 5,651,327 | Displacement, Submerged Displacement, Air Cushion Hydrofoil Ferry Boat | Jul. 29, 1997 |
| 5,711,494 | Aero-Hydroglider | Jan. 27, 1998 |
| 5,934,215 | Stabilized Air Cushioned Marine Vehicle | Aug. 10, 1999 |
| 6,293,216 | Surface Effect Ship (SES) Hull Configuration Having Improved High Speed Performance and Handling Characteristics | Sep. 25, 2001 |
| 6,439,148 | Low-Drag, High-Speed Ship | Aug. 27, 2002 |
| 2003/0000440 | Air Assisted Landing Craft | Jan. 02, 2003 |
| 6,526,903 | High speed M-shaped boat hull | Mar. 04, 2003 |
| 6,609,472 | Stable efficient air lubricated ship | Aug. 26, 2003 |
| 6,619,220 | Hybrid SES/hovercraft with Retractable Skirt System | Sep. 16, 2003 |
| 2005/0211150 | Variable Hybrid Catamaran Air Cushion Ship | Sep. 29, 2005 |
| 2005/0236200 | Wrapped-cone fingers for skirt systems | Oct. 27, 2005 |
| 7,013,826 | Hybrid Catamaran Air Cushion Ship | Mar. 21, 2006 |

BRIEF SUMMARY OF THE INVENTION

The present invention provides a catamaran surface effect ship that has a catamaran hull having spaced apart hulls connected with a platform and an integral propulsion system for propelling the hull.

The hull has forward and aft flexible seals and flexible side seals that enable pressurized air to be trapped in an air space that is positioned generally in between the hulls and in between the forward and aft flexible seals.

The hull has a powered lift fan system for transmitting pressurized air to the air space.

The side seal system for each hull includes a movable door that is movably (e.g. pivotally) attached to the side of each hull. An inflatable seal expands below the door and in between the door and the hull.

Locking dogs (e.g. motorized) positively lock the doors shut when the side cushion is deflated.

BRIEF DESCRIPTION OF THE SEVERAL VIEWS OF THE DRAWINGS

For a further understanding of the nature, objects, and advantages of the present invention, reference should be had to the following detailed description, read in conjunction with the attached drawings which are identified as follows.

DETAILED DESCRIPTION OF THE INVENTION

The marine vessel 10 of the present invention is designed to operate as both a catamaran and air cushion vessel. The catamaran air cushion vessel of the present invention is designated generally by the numeral 10 in FIGS. 1-9. Marine vessel 10 has several advantages over previous air cushion and surface effect ship designs. Marine vessel 10 has a robust structure having sufficient strength to withstand sea, cargo and beach operation loads. Marine vessel 10 also is lightweight for speed, endurance and cargo capacity performance.

Catamaran air cushion ship 10 is shown generally in FIGS. 1-9 and includes port hull 11, starboard hull 12, bow 13 and stern 14. Ship 10 may be constructed, for example, of high strength steel, aluminum, titanium, or composite materials such as fiberglass or carbon epoxy laminate.

Platform 15 spans between and connects the port hull 11 and starboard hull 12. The hull 12 is generally of the same configuration as the hull 11 of FIGS. 3-5. Platform 15 has a deck area 26. Deck area 26 is capable of withstanding local pressures greater than 500 psf (0.244 kg/cm$^2$) from the carriage of wheeled or tracked vehicles.

A forward seal 16 is provided at bow 13 and an aft or stern seal 17 is provided at stern 14. At bow 13, forward seal 16 can be in the form of a plurality of individual finger seals. Such seals 16, 17 can be seen for example in prior U.S. Pat. Nos. 3,621,932; 3,987,865; and 4,646,866 each hereby incorporated herein by reference. Forward seal 17 and stern seal 17 are capable of surviving high speed flow without significant impact on SES or Catamaran mode resistance.

Each hull 11, 12 provides a curved bottom 18, an outer side wall 19, and an inner side wall 21. The catamaran air cushion vessel 10 of the present invention can be scaled to a wide range of ship sizes, with overall length typically in the range of 100 feet to 1000 feet (30.5 m to 305 m), and beam in the range of 30 feet to 300 feet (9.1 m to 91 m). Cargo capacity will typically be 20% to 50% of full load displacement, which can range from 100 tons to 100,000 tons (90.7 metric tons to 90,700 metric tons).

Figure 1:
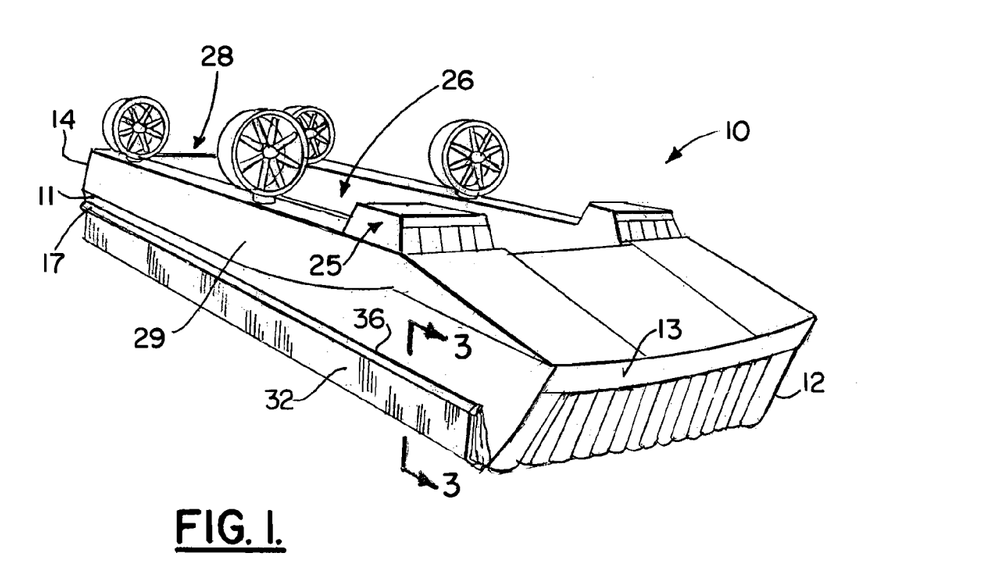
FIG. 1 is a perspective view of the preferred embodiment of the apparatus of the present invention.
Figure 2:
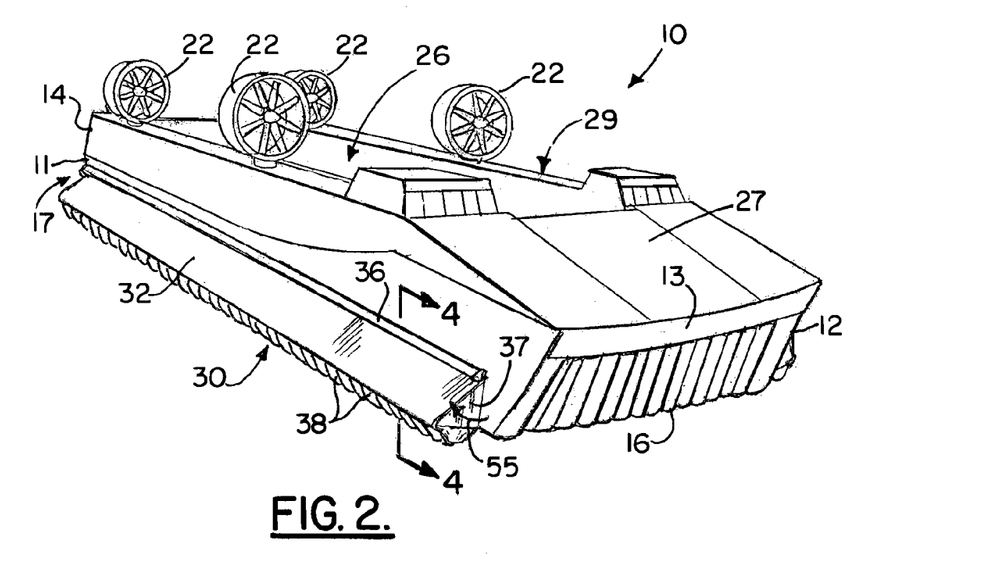
FIG. 2 is a perspective view of the preferred embodiment of the apparatus of the present invention.

The air cushion ship 10 has multiple water propellers 20, preferably a single water propeller 20 positioned at the stern of each hull 11, 12. The air cushion ship 10 also provides air propellers 22 that extend upwardly from the port hull 11 and starboard hull 12 as shown in FIGS. 1-2.

Figure 3:
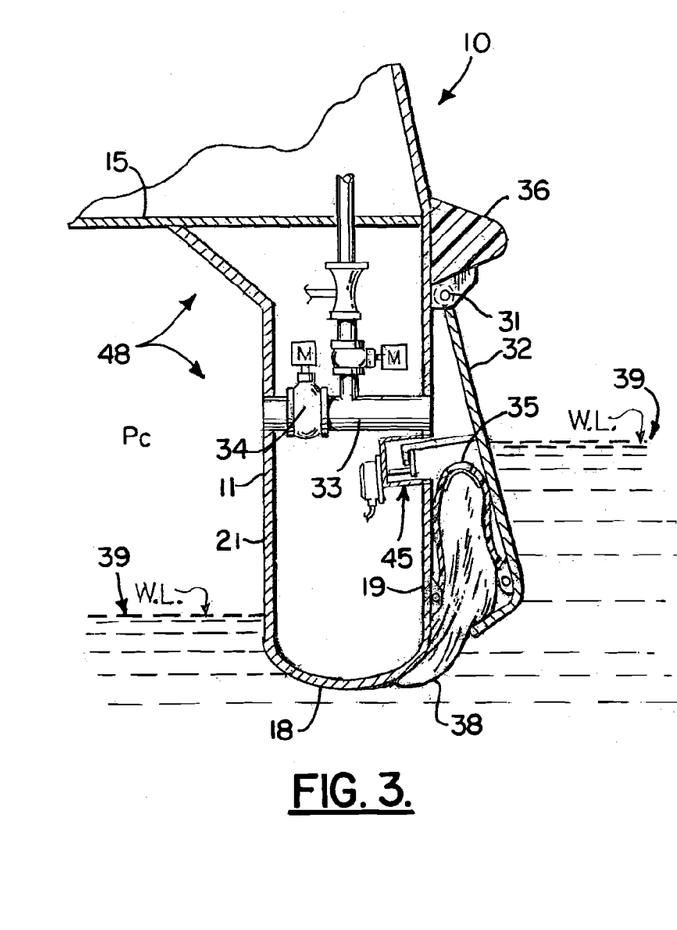
FIG. 3 is a sectional view taken along lines 3-3 of FIG. 1.
Figure 4:
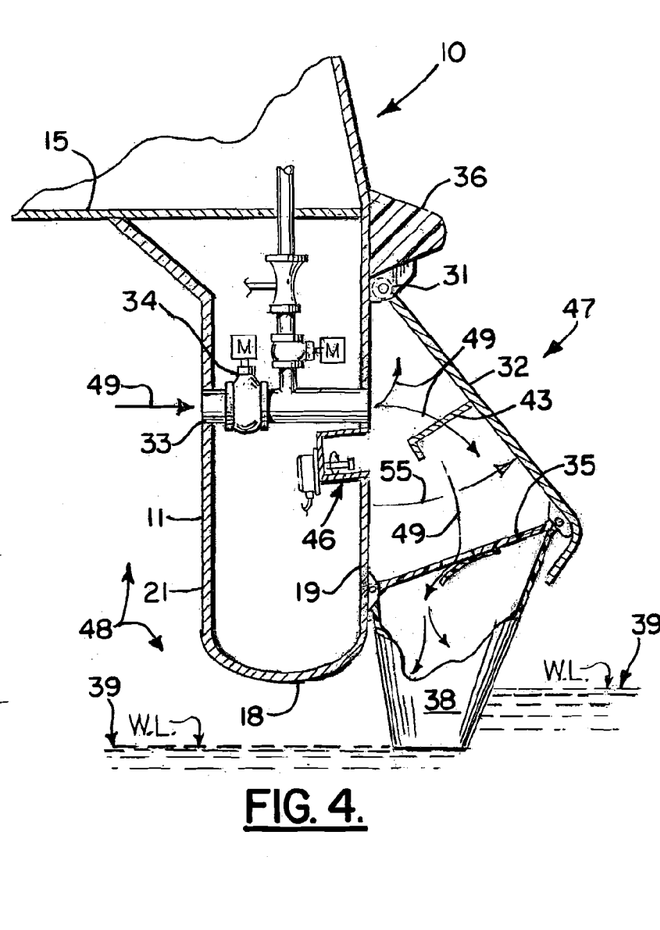
FIG. 4 is a sectional view taken along lines 4-4 of FIG. 2.
Figure 5:
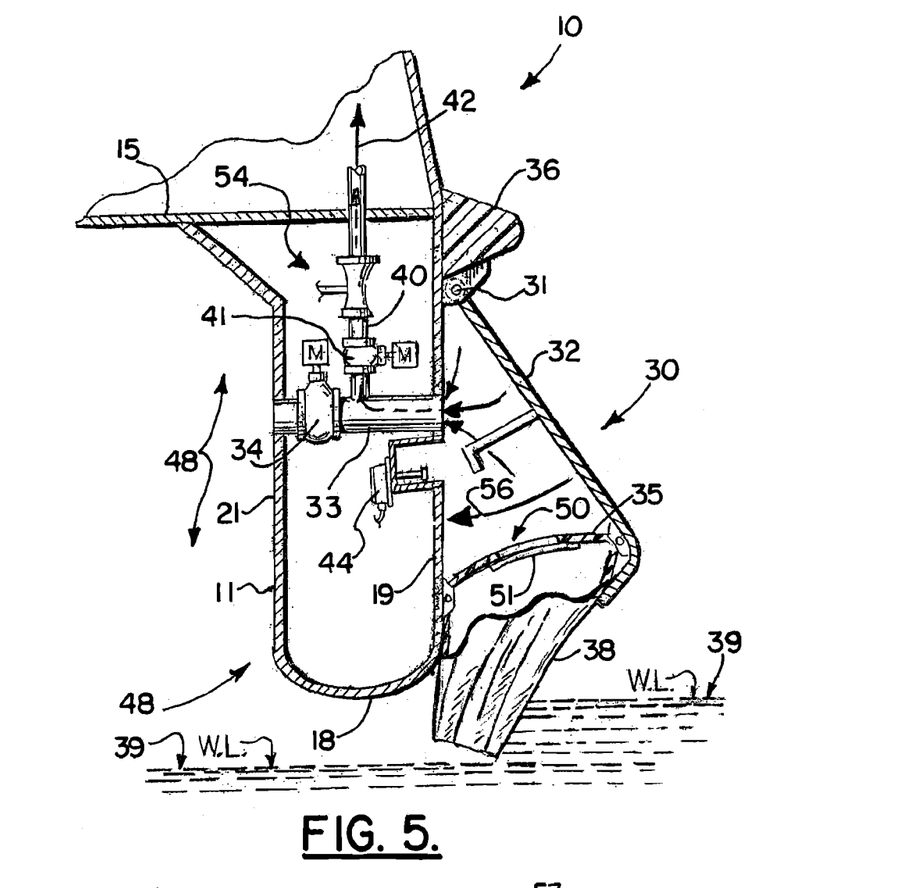
FIG. 5 is a schematic sectional, elevation view of the preferred embodiment of the apparatus of the present invention.

Inner side wall 21 is provided for each hull 11, 12 for enabling a cushion pressure (Pc) to be generated in between hulls 11, 12, platform 15 and waterline 39 as shown in FIGS. 3, 4 and 5. Rudders can be provided at 23, 24 including port rudder 23 and starboard rudder 24 as shown.

Platform 15 provides deck area 26 that communicates with bow ramp 27 and stern ramp 28. Vehicles and/or cargo can thus be driven or towed to deck area 26 using either bow ramp 27 or stern ramp 28. Likewise, vehicles, cargo and the like can be unloaded from the deck area 27 using either bow ramp 27 or stern ramp 28. Superstructure 29 supports air propeller 22 and a pilot house 25, crew quarters or the like.

A folding side seal 30 is provided for each hull 11, 12. The folding side seal 30 includes a door 32 that is movably attached to a hull 11 or 12 using for example hinge 31. The cushion pressure air (Pc) can be transmitted to inflate folding side seal 30 by routing the pressurized air via channel 33 to the interior of the folding side seal 30. Channel 33 can be valved using a valve 34.

Side seal 30 is capable of sustaining high speed flow without significant impact on SES or Catamaran mode resistance. The ability of side seal 30 to deploy and retract accommodates both SES and Catamaran modes of operation of marine vessel 10.

The folding side seal 30 includes a tension membrane 35 that extends between the bottom of each hull 11 or 12 and the lower end portion of door 32 as shown in FIGS. 3-5 and 8. The tension membrane 35 limits pivotal movement of door 32 to its maximum opening position of FIGS. 2 and 4. Arrow 55 shows door 32 opening in the outboard direction. Arrow 56 shows door 32 closing in the inboard direction.

A fender 36 can be positioned above hinge 31 as shown in FIGS. 1-5 and 8. Inflatable fingers 38 extend below tension membrane 35 as shown in FIGS. 3-5 and 8. Fingers 38 can be generally u-shaped in transverse cross section. Such fingers 38 can be of the type shown for example in the patents that were incorporated herein by reference. Air cushion pressure (Pc) communicates with fingers 38 below hull 11 or 12, extending them outwardly (see FIGS. 3-5, 8). End webs 37 can be provided on each hull 11, 12 fore and aft the fingers 38.

Figure 8:
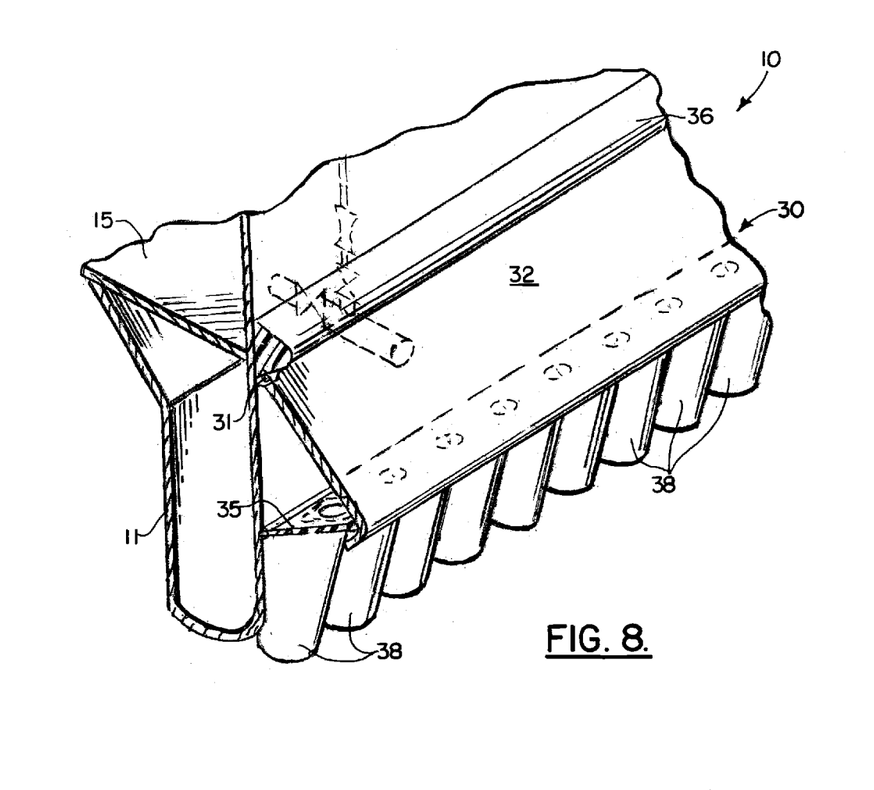
FIG. 8 is a partial perspective view of the preferred embodiment of the apparatus of the present invention.
Figure 9:
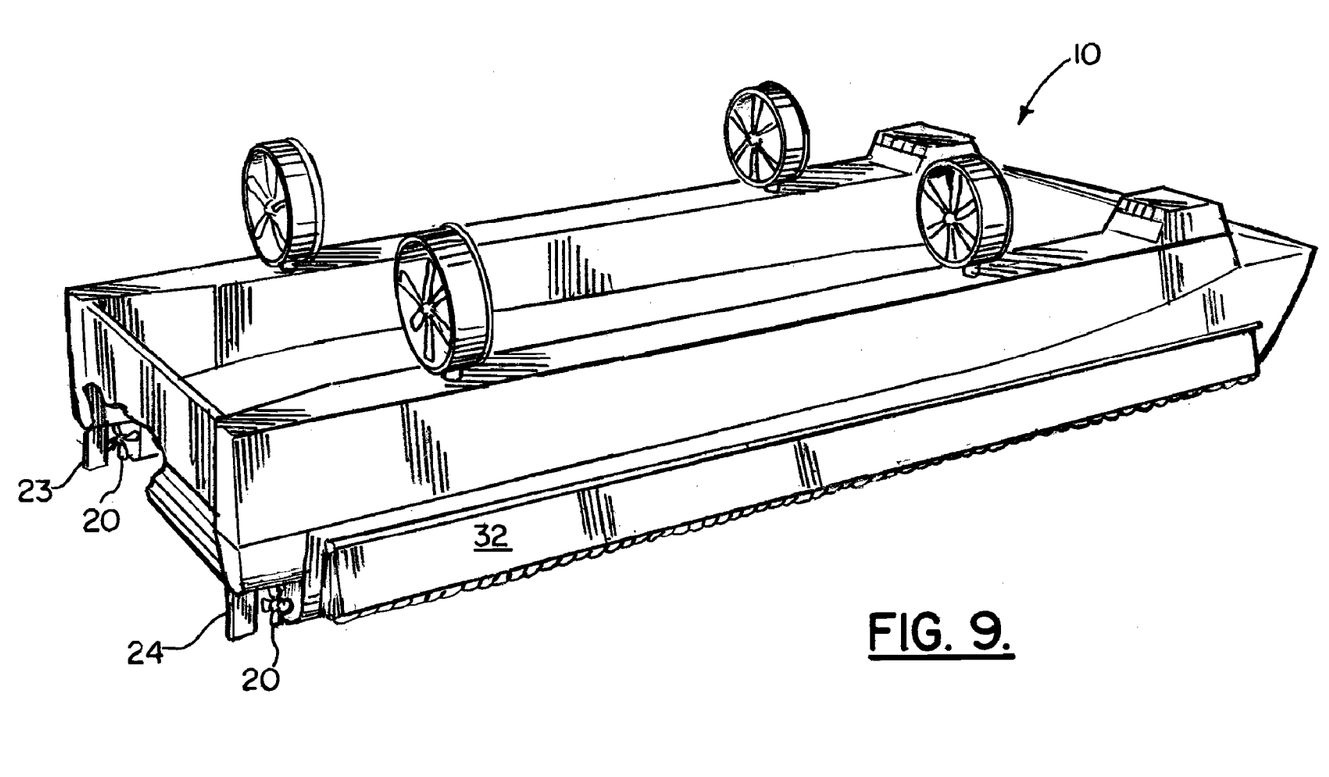
FIG. 9 is a perspective view from the stern of the preferred embodiment of the apparatus of the present invention.

An inflated position of folding side seal 30 is shown in FIGS. 2, 4 and 8. In FIG. 4, inflation is indicated by arrows 49 with air being transmitted from the space 48 that is under platform 15, in between hulls 11, 12 and above waterline 39. Arrows 49 illustrate the flow path of air as it travels to inflate the folding side seal 30. During inflation of side seal 30, locking dogs 43 are released, door 32 swings in the outboard direction 55 and fingers 38 are deployed/inflated.

A closed, folded position is shown in FIGS. 1 and 3. During retraction/deflation of side seal 30, air is removed from fingers 38, repositioning locking dogs 43, allowing door 32 to swings in the inboard direction 56.

In order to assist deflation of folding side seal 30, a vacuum can be provided. The vacuum can be a venturi arrangement 54 that includes flow line 40, valve 41 and a source of vacuum as indicated schematically by arrow 42 in FIG. 5. The vacuum 42 can be used to remove air from inflatable side seal 30, though hydrostatic pressure will also help collapse and deflate the fingers 38.

Once deflated, the side seal 30 can be locked in a closed position using motor operated locking dogs 43, each being powered with motor 44. A locked position 45 is shown in FIG. 3. An unlocked, operating position 46 is shown in FIG. 4.

FIGS. 3-5 illustrate inflation of seal 30, partial inflation being shown in FIG. 5 and complete inflation (operating ACV mode) being shown in FIG. 4. The full inflation position is indicated schematically by the numeral 47.

Figure 6:
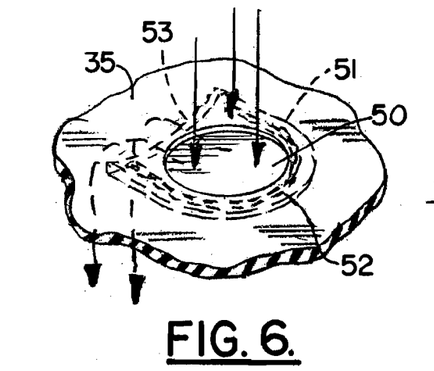
FIG. 6 is a fragmentary perspective view of the preferred embodiment of the apparatus of the present invention.
Figure 7:
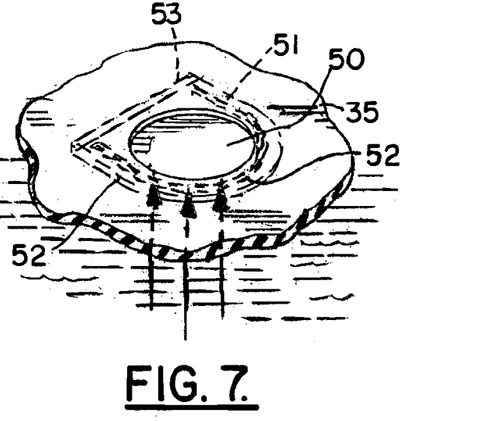
FIG. 7 is a fragmentary perspective view of the preferred embodiment of the apparatus of the present invention.

A drain arrangement is shown in FIGS. 6-7 for preventing accumulation of water above tension membrane 35. Opening 50 in tension membrane 35 allows water to drain from the upper surface of membrane 35 downwardly. A valving member 51 is mounted to the under surface of membrane 35 below opening 50. Valving member 51 is attached to the underside of membrane 35 at attached edge 52. Free edge 53 separates from membrane 35 when draining water from the upper surface of membrane 35 via opening 50.

The following is a list of suitable for the various elements of the preferred embodiment of the present invention.

| PARTS LIST | |
|---|---|
| Parts Number | Description |
| 10 | catamaran air cushion vessel |
| 11 | port hull |
| 12 | starboard hull |
| 13 | bow |
| 14 | stern |
| 15 | platform |
| 16 | forward seal |
| 17 | stern seal |
| 18 | curved bottom |
| 19 | outer side wall |
| 20 | water propeller |
| 21 | inner side wall |
| 22 | air propeller |
| 23 | port rudder |
| 24 | starboard rudder |
| 25 | pilot house |
| 26 | deck area |
| 27 | bow ramp |
| 28 | stern ramp |
| 29 | superstructure |
| 30 | folding side seal |
| 31 | hinge |
| 32 | door |
| 33 | channel |
| 34 | valve |
| 35 | tension membrane |
| 36 | fender |
| 37 | end web |
| 38 | finger |
| 39 | water level or waterline |
| 40 | flow line |
| 41 | valve |
| 42 | vacuum source - venturi arrow |
| 43 | motor operated locking dog |
| 44 | motor |
| 45 | locked position |
| 46 | unlocked, operating position |
| 47 | full inflation height |
| 48 | space |
| 49 | arrow |
| 50 | opening |
| 51 | valving member |
| 52 | attached edge |
| 53 | free edge |
| 54 | venturi |
| 55 | arrow |
| 56 | arrow |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A catamaran surface effect ship, comprising:
   a) catamaran hull having spaced apart hulls connected with a platform, and an integral propulsion system for propelling the catamaran hull;
   b) forward and aft seals on the catamaran hull that enable pressurized air to be trapped in an air space that is positioned generally in between the spaced apart hulls and in between the seals;
   c) the catamaran hull containing a powered lift fan system for transmitting pressurized air to the air space; and
   d) a side seal system for each spaced apart hull including a movable door that is movably attached to the side of each spaced apart hull and an inflatable seal that extends below the door and in between the door and the spaced apart hull.

2. The catamaran surface effect ship of claim 1, wherein each door is pivotally attached to a spaced apart hull.

3. The catamaran surface effect ship of claim 1, wherein each door attaches to a spaced apart hull with a hinge.

4. The catamaran surface effect ship of claim 1, wherein the inflatable seal includes a tensile membrane that extends between the spaced apart hull and the door.

5. The catamaran surface effect ship of claim 4, wherein each membrane attaches to the lower end portion of a door.

6. The catamaran surface effect ship of claim 4, wherein the membrane carries one or more drains for emptying water from the seals.

7. The catamaran surface effect ship of claim 1, wherein a channel extends through the catamaran hull to inflate the inflatable seal.

8. The catamaran surface effect ship of claim 7, wherein the channel is positioned above a maximum water line during use.

9. The catamaran surface effect ship of claim 8, wherein the channel is valved.

10. The catamaran surface effect ship of claim 9, wherein the channel is connected to a source of vacuum for deflating at least in part the inflatable seal.

11. The catamaran surface effect ship of claim 10, wherein the vacuum source is a venturi that is valved to selectively pull a vacuum on the inflatable seal.

12. The catamaran surface effect ship of claim 1, further comprising a locking mechanism that positively locks each door to the spaced apart hull in a closed position.

13. The catamaran surface effect ship of claim 12, wherein the locking mechanism includes motor operated locking dogs that enable the doors to be secured in a closed position.

14. The catamaran surface effect ship of claim 1, wherein the seals can be deflated using hydrostatic pressure at least in part.

15. The catamaran surface effect ship of claim 1, wherein the upper end of each of the doors attaches to the spaced apart hulls at a position next to the top of the spaced apart hull.

16. The catamaran surface effect ship of claim 1, wherein one or more of the seals is flexible.

17. The catamaran surface effect ship of claim 1, wherein the propulsion system includes propellers.

18. The catamaran surface effect ship of claim 17, wherein the propellers are operable independently such as when the catamaran hull is to be beached.

19. The catamaran surface effect ship of claim 1 wherein the seals further comprise at least one flexible finger.

20. The catamaran surface effect ship of claim 1, wherein each of the spaced apart hulls is a float that extends below the platform, each float having an inner surface that defines a side of the air space between the spaced apart hulls.

21. The catamaran surface effect ship of claim 20, wherein the inner surface extends downwardly from the platform.

22. The catamaran surface effect ship of claim 21, wherein the inner surface is generally vertically extended.

23. The catamaran surface effect ship of claim 1, wherein the spaced apart hulls are floats, each float having inner and outer surfaces and a keel below the inner and outer surfaces.

24. The catamaran surface effect ship of claim 23, wherein each movable door attaches to a float at the outer surface of the float.

25. The catamaran surface effect ship of claim 23, wherein the door moves between open and closed positions, the door closely abutting the float outer surface in the closed position.

26. The catamaran surface effect ship of claim 23, wherein the forward seal extends from one float to the other float.

27. The catamaran surface effect ship of claim 23, wherein the aft seal extends from one float to the other float.

28. The catamaran surface effect ship of claim 1, wherein each spaced apart hull has an inner hull surface, an outer hull surface and a keel, the inner hull surface extending downwardly from the platform, the air space extending below the platform, above a water surface and in between inner surfaces of the spaced apart hulls.

29. The catamaran surface effect ship of claim 28, wherein each movable door attaches to a float at an outer surface of the float.

30. The catamaran surface effect ship of claim 28, wherein the forward seal extends from one float to the other float.

31. The catamaran surface effect ship of claim 28, wherein the aft seal extends from one float to the other float.

32. The catamaran surface effect ship of claim 28, wherein the side seal system inflatable seal extends below the keel when inflated.

33. The catamaran surface effect ship of claim 1, wherein the inflatable seal extends below the bottom of each spaced apart hull when inflated.

34. A catamaran surface effect ship, comprising:
    a) a catamaran hull having spaced apart hulls connected with a platform, and an integral propulsion system for propelling the hull;
    b) forward and aft seals on the catamaran hull that enable pressurized air to be trapped in an air space that is positioned generally in between the spaced apart hulls and in between the seals;
    c) the catamaran hull containing a powered lift fan system for transmitting pressurized air to the air space;
    d) a door pivotally attached to the outer surface of each spaced apart hull, each door having a top and a bottom end portion; and
    e) an inflatable portion that rotates the bottom of the door away from the outer side of the spaced apart hull.

35. The catamaran surface effect ship of claim 34, the inflatable portion further comprising a flexible membrane extending from the spaced apart hull to the door.

36. The catamaran surface effect ship of claim 35, further comprising a valving member.

37. The catamaran surface effect ship of claim 34, further comprising an internal locking mechanism that positively locks the door to the spaced apart hull.

38. The catamaran surface effect ship of claim 34, further comprising a channel extending from the air space through to the inflatable portion.

39. The catamaran surface effect ship of claim 34, wherein each spaced apart hull has an inner hull surface, an outer hull surface and a keel, the inner hull surface extending downwardly from the platform, the air space extending below the platform, above a water surface and in between inner surfaces of the spaced apart hulls.

40. The catamaran surface effect ship of claim 39, wherein each door attaches to a float at the outer surface of the float.

41. The catamaran surface effect ship of claim 39, wherein the forward seal extends from one float to the other float.

42. The catamaran surface effect ship of claim 39, wherein the aft seal extends from one float to the other float.

43. The catamaran surface effect ship of claim 39, further comprising a side seal system inflatable seal which extends below the keel when inflated.

44. The catamaran surface effect ship of claim 34, wherein each of the spaced apart hulls is a float that extends below the platform, each float having an inner surface that defines a side of the air space between the spaced apart hulls.

45. The catamaran surface effect ship of claim 44, wherein the inner surface extends downwardly from the platform.

46. The catamaran surface effect ship of claim 45, wherein the inner surface is generally vertically extended.

47. The catamaran surface effect ship of claim 34, wherein the spaced apart hulls are floats, each float having inner and outer surfaces and a keel below the inner and outer surfaces.

48. The catamaran surface effect ship of claim 47, wherein each door attaches to a float at the outer surface of the float.

49. The catamaran surface effect ship of claim 48, wherein the door moves between open and closed positions, the door closely abutting the float outer surface in the closed position.

50. The catamaran surface effect ship of claim 47, wherein the forward seal extends from one float to the other float.

51. The catamaran surface effect ship of claim 47, wherein the aft seal extends from one float to the other float.

52. A catamaran surface effect ship, comprising:
    a) a catamaran hull having spaced apart spaced apart hulls connected by and extending downwardly from a platform, a tunnel being formed in between the spaced apart hulls, below the platform and above the water surface, each spaced apart hull having an inner surface and an outer surface;
    b) forward and aft seals that each extend laterally from one of the floats to the other float, the forward and aft seals and floats enabling a pressurized air cushion to be trapped in an air space that includes the tunnel, said air space surrounded by the floats and the seals;
    c) the catamaran hull containing a powered lift fan system for transmitting pressurized air to the air space; and
    d) a side seal system for each float including a movable door that is movably attached to the outer surface of each float and an inflatable seal that extends below the door and in between the door and the float.

* * * * *